United States Patent
Deighton

(10) Patent No.: US 11,496,726 B2
(45) Date of Patent: Nov. 8, 2022

(54) SYSTEM AND METHOD FOR REALTIME LED VIEWING ANGLE CORRECTION

(71) Applicant: Brompton Technology Ltd., London (GB)

(72) Inventor: Christopher Deighton, Chislehurst (GB)

(73) Assignee: Brompton Technology Ltd., London (GB)

( * ) Notice: Subject to any disclaimer, the term of this patent is extended or adjusted under 35 U.S.C. 154(b) by 0 days.

(21) Appl. No.: 17/374,546

(22) Filed: Jul. 13, 2021

(65) Prior Publication Data

US 2022/0014728 A1  Jan. 13, 2022

Related U.S. Application Data

(60) Provisional application No. 63/051,100, filed on Jul. 13, 2020.

(51) Int. Cl.
| | |
|---|---|
| *H04N 13/366* | (2018.01) |
| *H04N 13/324* | (2018.01) |
| *H04N 13/133* | (2018.01) |
| *G09F 9/33* | (2006.01) |

(52) U.S. Cl.
CPC ............. *H04N 13/366* (2018.05); *G09F 9/33* (2013.01); *H04N 13/133* (2018.05); *H04N 13/324* (2018.05)

(58) Field of Classification Search
CPC .. H04N 13/366; H04N 13/133; H04N 13/324; G09F 9/33
USPC .......................................................... 348/51
See application file for complete search history.

(56) References Cited

U.S. PATENT DOCUMENTS

| | | | |
|---|---|---|---|
| 10,192,358 B2* | 1/2019 | Robbins | ............... H04N 13/371 |
| 2005/0117186 A1 | 6/2005 | Li et al. | |
| 2016/0202758 A1* | 7/2016 | Peana | ...................... G06F 3/013 |
| | | | 345/601 |
| 2019/0005879 A1* | 1/2019 | Shin | ....................... G09G 3/003 |
| 2019/0051230 A1* | 2/2019 | Jeon | ...................... G09G 3/3233 |
| 2019/0244564 A1* | 8/2019 | Peana | ...................... G09G 3/03 |
| 2019/0320133 A1 | 10/2019 | Kuplevakhsky | |
| 2020/0211440 A1 | 7/2020 | Lee et al. | |

OTHER PUBLICATIONS

PCT International Search Report and PCT Written Opinion of the International Searching Authority; Application No. PCT/EP2021/069408; dated Nov. 3, 2021; 22 pages.

* cited by examiner

*Primary Examiner* — Tung T Vo
(74) *Attorney, Agent, or Firm* — Conley Rose, P. C.; Brooks W Taylor

(57) ABSTRACT

A video display device includes LED pixels, a memory, and a processor. The processor receives video data that includes video pixels that correspond to the LED pixels. For at least some of the video pixels, the processor calculates a viewing angle for the LED pixel based on (i) a 3D location and optical axis vector for the LED pixel and (ii) a 3D location of a viewer of the LED pixel. The processor calculates a gain factor for the LED pixel based on the viewing angle and a relationship between pixel intensity and pixel viewing angle for the LED pixel. The processor calculates a compensated brightness for the LED pixel based on the gain factor and a brightness of the video pixel. The processor causes the LED pixel to emit light having the compensated brightness.

20 Claims, 6 Drawing Sheets

SYSTEM AND METHOD FOR REALTIME LED VIEWING ANGLE CORRECTION

CROSS-REFERENCE TO RELATED APPLICATIONS

This application claims priority to U.S. Provisional Application No. 63/051,100 filed on Jul. 13, 2020 by Christopher Deighton, entitled "System and Method for Realtime LED Viewing Angle Correction", which is incorporated by reference herein as if reproduced in its entirety.

TECHNICAL FIELD OF THE DISCLOSURE

The disclosure generally relates to light emitting diode (LED) video screens, and more specifically to a method for compensating for the viewing angle of such a screen in real time such that a smooth output is produced.

BACKGROUND

Red, Green, Blue (RGB) LEDs may be optically non-ideal for use in LED display screens. For example, an ideal RGB LED or LED screen would have ideal viewing angles, which is to say that an LED or a uniform array of LEDs making up an LED screen would emit light in all directions within a hemisphere, such that whatever direction the LED or screen is viewed from, it would appear to be (a) the same brightness, and (b) the same colour (as all three colours are similarly uniform).

Unfortunately, typical real-world RGB LEDs and LED screens have non-ideal emission patterns. The LED lens may not be designed to approximate an 'ideal' emission pattern (most often such lenses are designed to produce peak light output when the LED or the LED screen is viewed 'straight-on'), and the radiation patterns are different per-colour. In some cases, this is due to the slightly different positions of the R, G, and B dies relative to the package's lens (and may also be caused by other optical properties of the lens, such as chromatic aberration).

Shaders' (black plastic frames mounted around the LEDs) are designed to 'shade' the surface of the LEDs from ambient light, thus increasing the contrast ratio of the screen. Unfortunately, they may also block outgoing light in some directions, further disrupting the spatial uniformity of the emitted light. Again, this effect may differ per-colour, as the R, G, and B dies may be positioned in slightly different locations relative to the shader.

Smaller pixel pitches and newer packaging technologies (such as 4-in-1 LED packages) can exacerbate this problem, as each LED package becomes smaller and the optics become more difficult to design and manufacture.

Some other recently employed techniques (such as covering the LEDs in a layer of protective material (similar to resin) may also affect the uniformity and colour of the light emitted as the light passes through this additional layer of material. The viewing direction may result in a shorter or longer path through the material (this can affect the absorption of the light), and this effect may be different per-colour. The material itself may also have other optical properties that affect the uniformity of the light emitted, and this effect also may be different per-colour.

Such variations in light output may not be immediately visible, as (a) the viewing angle may change gradually across the surface of the screen, so the apparent brightness and colour also change only gradually, and (b) the human visual system is very forgiving of gradual changes in brightness and colour, interpreting them as an artefact of varying lighting conditions over a uniform surface (rather than as uniform lighting over a varying surface).

However, the viewing-angle-related brightness and colour shift may become an issue when using LED screens for visual effects work or other applications where colour consistency is important.

The problem may become much more visible in certain circumstances. In a first example, LED panels may be mounted close to each other, but at one or more angles relative to each other (creating 'folds', 'bends', 'corners', or 'curves'). This may result in a step-change in the viewing angles of the LEDs of the various panels. As a result, a step change in brightness and/or colour may be perceived where the panels abut or overlap.

In a second example, different types of LED screens (i.e. screens with different LEDs/shaders/optics) may be mounted close to each other and configured so that their brightness and colour output match when observed from a given viewer position. Changing the viewing angle may result in a mis-match in brightness and/or colour being observed due to differences in the LEDs' radiation patterns. Where there is a step-change in LED type, it leads to a step-change in emission pattern and observed brightness and/or colour from the viewer position.

If such situations are encountered, a resulting step-change in light output (even if relatively small) is likely to be immediately visible due to the sensitivity of the human visual system to edges (such as step-changes).

Such problems can cause issues in a number of different situations, but they're particularly problematic when attempting to use LED screens to form a 'virtual backdrop' for a film set, broadcast studio, or other production site. Corners may result when using screens that are built in a flat plane, such as when building a 'cube' out of flat LED screens. Even when the screen is fabricated in a curve, the screen is often curved only in one dimension (as would be used to form a cylinder, for example), so there may still be a sharp corner between the curved surface of the cylinder (walls) and a top (roof) or bottom (floor) of the cylinder.

The intention is to be unaware of the LED screen, instead seeing only the content being displayed on it, however changes in brightness or colour of the viewed image may reveal the presence of the screen, affecting the perception of the content. Accurate colorimetry of the display is also important, to ensure that the content can be correctly displayed and accurately captured on-camera. Errors in the colorimetry may result in problems such as mis-matching colours between the virtual backdrop displayed on the LED screen and the physical set, requiring further tweaking of the displayed content on-set, or in the resulting captured images in post-production, either of which may be time consuming and expensive.

Cameras are often not stationary, so even when the content or display system is manually adjusted to improve matching between multiple screens and/or the physical set, the adjustment may only be effective from a single viewer position, and when the camera moves the adjustment may no longer be correct. Moreover, even from a single viewer position, the viewing angle to each pixel of a large LED screen is slightly different, with the result that a single adjustment of brightness/colour applied across the entire screen is not equally effective for all LEDs of the screen.

It is difficult to fully correct the viewing-angle-related issues for situations with a large number of simultaneous viewers in different viewer positions, such as an audience. In such situations, each viewer would benefit from different corrections being applied to the LED screens. However, film and TV are different in that there is often a single viewer position of primary importance, namely the camera. Achieving improved visual output only from that one viewing position is easier. Other viewing positions may be of lesser importance (however, exceptions might include when images reflected in elements of the physical set or when the screen is used to provide lighting for the physical set) and so it is of significant value to correct the system for the camera's viewing position.

SUMMARY

In a first embodiment, a video display device includes a plurality of light emitting diode (LED) pixels, a memory storing instructions, and a processor coupled to the plurality of LED pixels and the memory and configured to execute the instructions stored in the memory. The processor receives a frame of video data that includes a plurality of video pixels that correspond to the LED pixels. For at least some of the video pixels in the frame that correspond to LED pixels, the processor calculates a viewing angle for the LED pixel based on (i) screen geometry information that relates to a three-dimensional (3D) location and optical axis vector for the LED pixel and (ii) viewer position information relating to a 3D location of a viewer of the LED pixel. The processor also calculates a gain factor for the LED pixel based on the viewing angle and a pixel gain table that includes information relating to a relationship between pixel intensity and pixel viewing angle for the LED pixel. The processor further calculates a compensated brightness for the LED pixel based on the gain factor and a brightness of the video pixel and causes the LED pixel to emit light having the compensated brightness.

In a second embodiment, a video processing device includes a memory storing instructions; and a processor coupled to the memory and configured to execute the instructions stored in the memory. The processor generates a viewing angle map that includes individual viewing angles for a plurality of light emitting diode (LED) pixels of a video display device, the individual viewing angles based on (i) screen geometry information relating to three-dimensional (3D) locations and optical axis vectors for the LED pixels and (ii) viewer position information relating to a 3D location of a viewer of the video display device. The processor also generates a pixel gain map that includes individual gain factors for the LED pixels based on the viewing angle map and a pixel gain table that includes information relating to a relationship between pixel intensity and pixel viewing angle for the LED pixels. The processor further generates frames of compensated video data by calculating compensated video pixel brightness in received frames of a video signal based on the pixel gain map and transmits the frames of compensated video data to the video display device. The frames of compensated video data are configured to cause the LED pixels to emit light having the compensated video pixel brightness of corresponding video pixels.

In a third embodiment, a video processing device includes a memory storing instructions and a processor coupled to the memory and configured to execute the instructions stored in the memory. The processor generates a viewing angle map that includes individual viewing angles for a plurality of light emitting diode (LED) pixels of a video display device, the viewing angle map based on (i) screen geometry information that relates to three-dimensional (3D) locations and optical axis vectors for the LED pixels and (ii) viewer position information relating to a 3D location of a viewer of the video display device. The processor also generates a pixel gain map that includes individual gain factors for the LED pixels based on the viewing angle map and a pixel gain table that includes information relating to a relationship between pixel intensity and pixel viewing angle for the LED pixels. The processor further transmits the pixel gain map to a video display device. The pixel gain map is configured to cause the video display device to compensate pixel brightness of received frames of a video signal based on the pixel gain map.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein.

DETAILED DESCRIPTION

Described embodiments are illustrated in the figures, like numerals being used to refer to like and corresponding parts of the various drawings.

Figure 1:
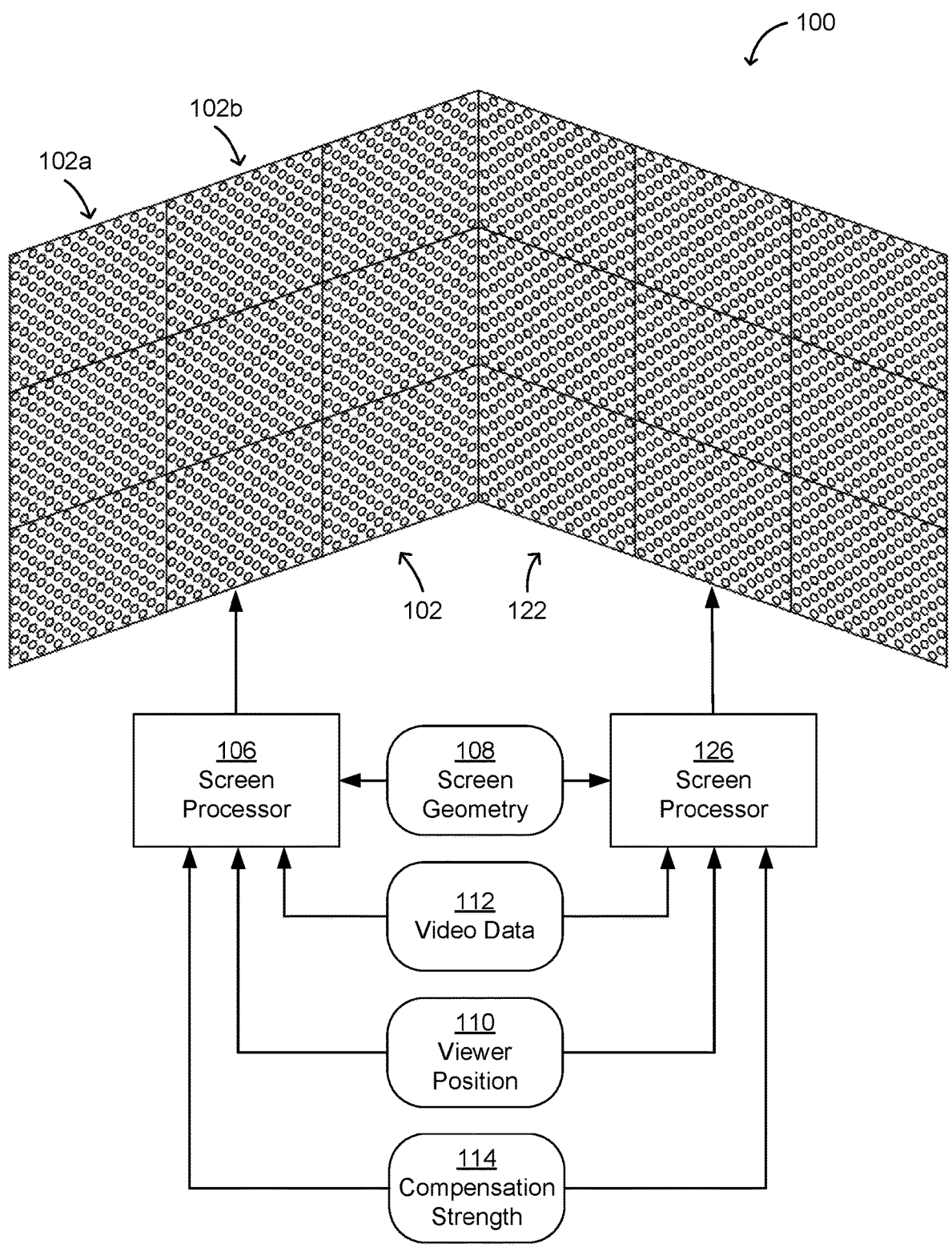
FIG. 1 is a system diagram according to an embodiment of the disclosure.

FIG. 1 presents a system 100 diagram according to an embodiment of the disclosure. Video display screens 102 and 122 are light emitting video display screens each comprising an array of individual pixels where each pixel consists of at least one LED. In further embodiments the pixels could comprise organic light emitting diodes (OLEDs), or other devices capable of emitting light as a pixel for a video screen. In some embodiments, one or both of the video display screens 102 and 122 comprise a plurality of LED panels, such as those indicated by reference characters 102a and 102b.

Video display screen 102 is controlled by screen processor 106 and video display 122 is controlled by screen processor 126. The screen processors 106 and 126 send data to the video walls indicative of which pixels are to be illuminated and the color and the intensity of those pixels. For a video display these values may be updated at rates including, but not limited to, 30, 60, or more times per second. Additionally, video display screens 102 and 122 may include internal processing systems capable of further modifying the intensity and color of individual pixels, either in response to commands from the screen processors 106 and 126, or autonomously. In some embodiments, each of the plurality of LED panels includes such an internal processing system. In other embodiments, a video screen includes a single internal processing system for all its LED panels or LEDs.

Screen processor 106 has inputs including, but not limited to, video data 112, screen geometry information 108, and viewer position information 110. Video data 112 includes data representative of the image that is to be displayed on the video display screen 102. Screen geometry information 108 includes data that is indicative of the position and orientation in three-dimensional (3D) space of the pixels of video display screen 102. This data may be static for a stationary, fixed video display screen 102, or continuously changing in the case of a moving video display screen 102. The viewer position information 110 is data that is indicative of the position in 3D space of the position of a film or video camera, or other viewing device. In all cases 3D data is reported relative to a common, fixed datum in the space, or can be transformed to be as such. The screen geometry information 108 and the viewer position information 110 are both referred, or constrained to conform, to the same datum, or can both be transformed to be as such.

Similarly, screen processor 126 has inputs including, but not limited to, video data 112, screen geometry information 108, and viewer position information 110. Video data 112 includes data representative of the image that is to be displayed on the video display screen 122. The screen geometry information 108 includes data that is indicative of the position and orientation in 3D space of the pixels of video display screen 122. This data may be static for a stationary, fixed video display screen 122, or continuously changing in the case of a moving video display screen 122. The viewer position information 110 is data that is indicative of the position in 3D space of the position of a film or video camera, or other viewing device. In all cases 3D data is reported relative to a common, fixed datum in the space, or can be transformed to be as such. The screen geometry information 108 and the viewer position information 110 are both referred, or constrained to conform, to the same datum, or can both be transformed to be as such.

Screen processors 106 and 126 each receive a compensation strength control parameter 114 as an input. As described in more detail with reference to FIGS. 4-6, the compensation strength control parameter 114 is used to scale the amount of compensation applied by LED viewing angle correction systems according to the disclosure.

Figure 2:
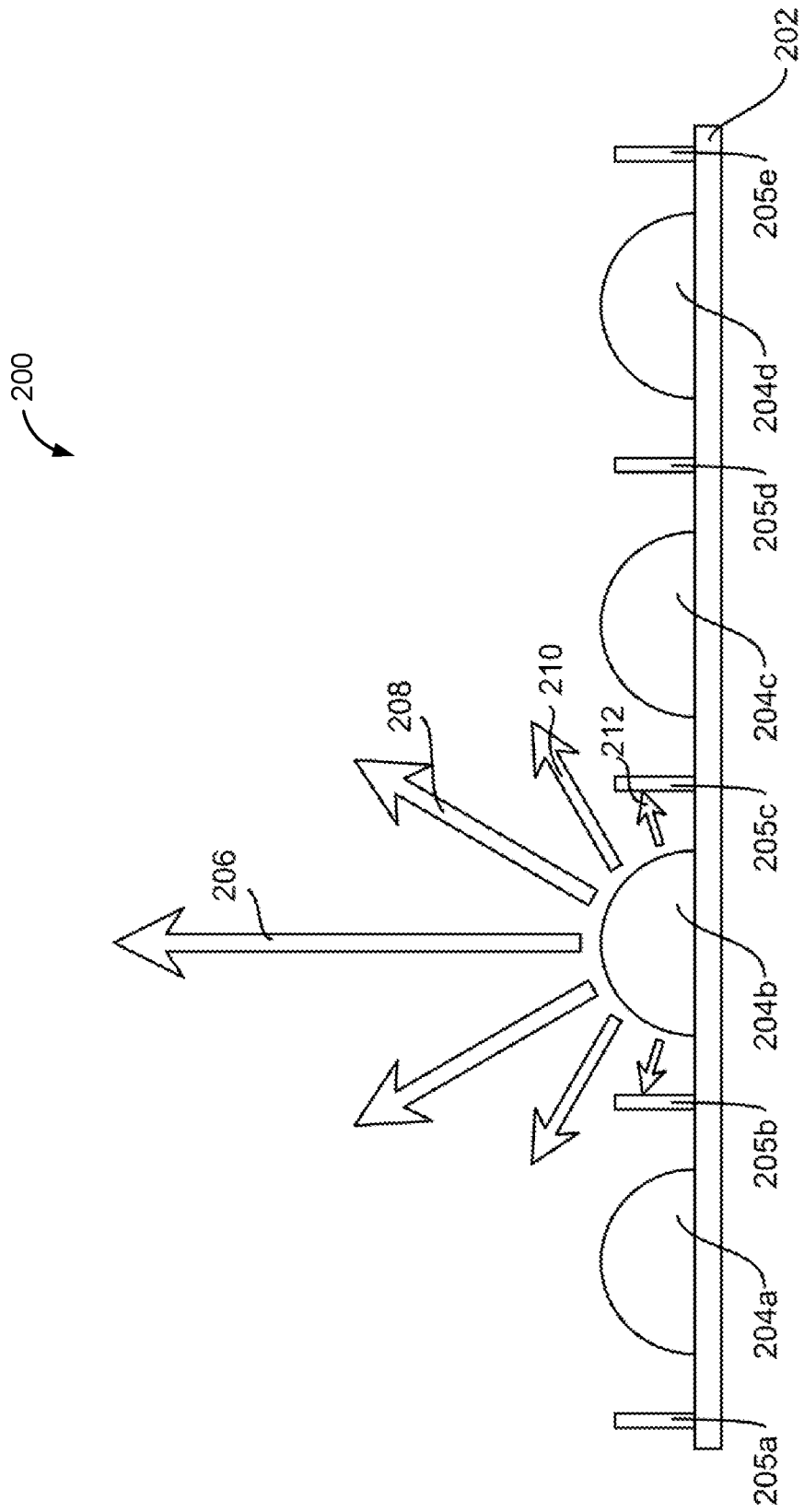
FIG. 2 is a schematic representation of light output from video display pixels according to an embodiment of the disclosure.

FIG. 2 presents a schematic representation of light output 200 from video display pixels according to an embodiment of the disclosure. Light emitting pixels 204a, 204b, 204c, and 204d, which may be LEDs, are mounted to substrate 202. Shaders (or barriers) 205a, 205b, 205c, 205d, and 205e are opaque or translucent shields between the light emitting pixels 204a, 204b, 204c, and 204d. Arrows 206, 208, 210 and 212 indicate schematically by their size the brightness of the light being emitted from light emitting pixel 204b in their respective directions. The light emitted perpendicular, arrow 206, to the mounting substrate 202 may be the brightest output. The light output may diminish as the angle from the perpendicular increases, as indicated by arrows 208 and 210. Finally, light at an extreme angle from the perpendicular, as indicated by arrow 212, may be completely blocked by shader 205c.

This distribution of light output from the light emitting pixels is usually a complex function not following simple distribution curves such as the Lambertian. Instead the light output shape is determined by a combination of the shape and emittance pattern of the light emitting LED die, the construction of the package, the electrical connections, any optical assemblies mounted to the LED and other parameters that may vary from one pixel or LED panel or video display to another. In practice the best way to accurately determine this light distribution is often to measure it after the video display is manufactured.

A 'virtual production' may provide real-time camera tracking technology (e.g., so that the virtual backdrop can be rendered with the correct perspective from the camera's location). An LED viewing angle correction system according to the disclosure may use such existing camera location information (or an alternate source of camera location information) to compute viewing-angle corrections for the current camera position. In some embodiments, such a system may provide corrections based on static or manually-updated viewing angle location information to at least achieve a 'first order' correction. For example, for an audience, the location of the centre of the audience may be used; for a static camera, a manually entered camera location may be used; and for a moving camera, a mid-point of the camera's motion path may be used, etc.

Figure 3:
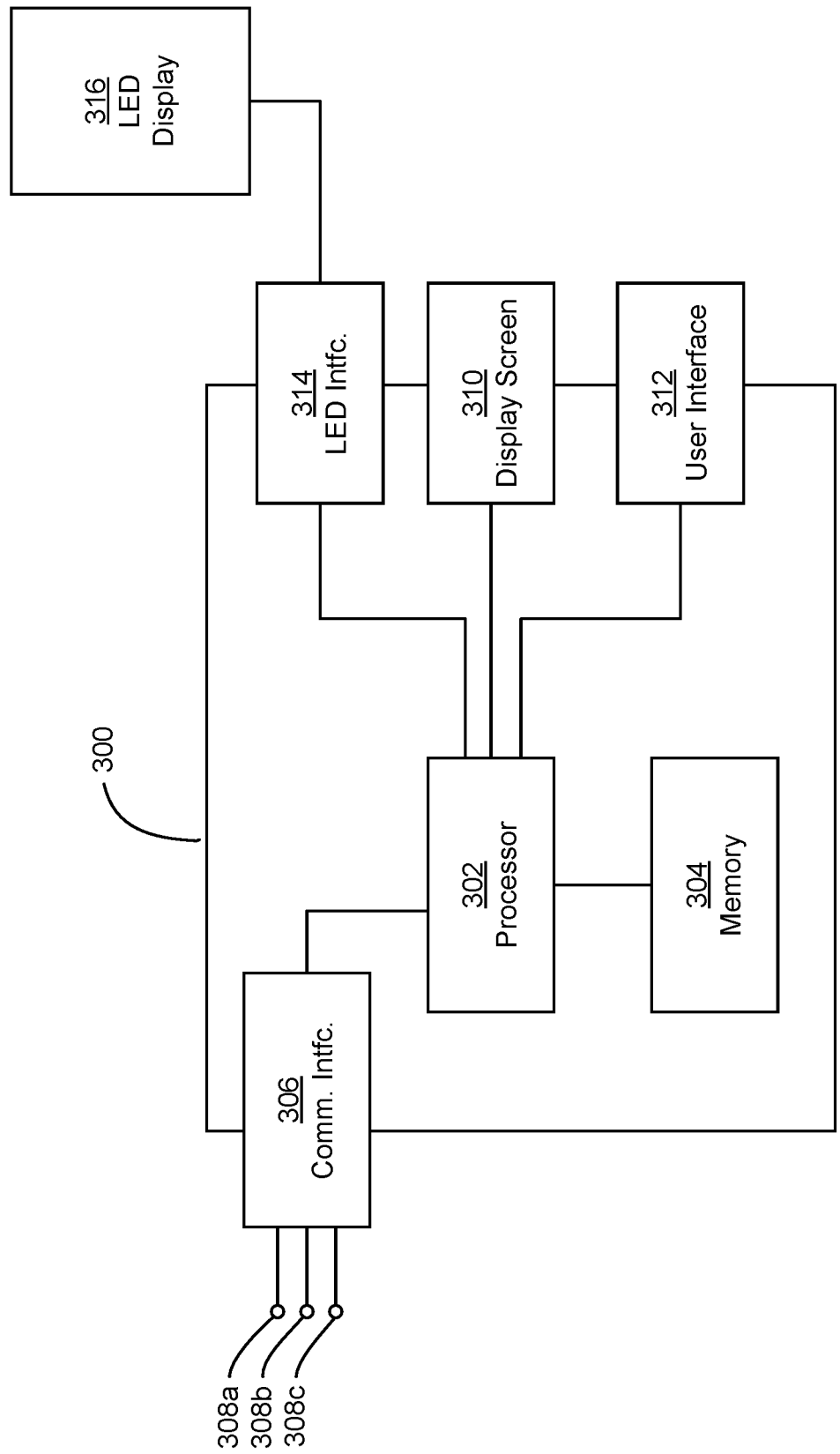
FIG. 3 is a block diagram of a controller for an LED viewing angle correction system according to an embodiment of the disclosure.

FIG. 3 presents a block diagram of a controller 300 for an LED viewing angle correction system according to the disclosure. The controller 300 is suitable for use in any of the screen processors 106 and 126, the video display screens 102 and 122, and LED panels 102a and 102b. The controller 300 includes a processor 302 electrically coupled to a memory 304. The processor 302 is implemented by hardware and software. The processor 302 may be implemented as one or more Central Processing Unit (CPU) chips, cores (e.g., as a multi-core processor), field-programmable gate arrays (FPGAs), application specific integrated circuits (ASICs), and digital signal processors (DSPs).

The processor 302 is further electrically coupled to and in communication with a communication interface 306, a user display screen 310, and a user interface 312. The communication interface 306 is configured to receive a video signal via one or more communication links 308a. The communication interface 306 also is configured to communicate with external control devices via one or more Ethernet, Universal Serial Bus (USB) or serial communication links 308b. The communication interface 306 also is configured to send and/or receive LED panel control signals via one or more additional Ethernet communication links 308c. In some embodiments, two or more of these communication links may share a smaller number of physical interfaces by using techniques such as time division multiplexing, packet switching, or other suitable techniques.

The processor 302 is configured to display system information to a user via the user display screen 310 and to output and receive user control information via the user interface 312. While the controller 300 includes the user display screen 310 and the user interface 312, other embodiments do not include a user display screen and user interface, and user control information may be sent and received via one or more of the Ethernet communication links 308b or other suitable communication link.

In embodiments where the controller 300 is used in a video display device, the controller 300 further includes an LED interface circuit 314 coupled to an LED display 316. In various embodiments, the LED interface circuit 314 may communicate with the LED display 316 via a serial or parallel link, enabling the controller 300 to control the brightness of LEDs of the LED display 316.

The controller 300 is suitable for use in video processing devices and video display devices as described with reference to FIGS. 4-6 and for implementing processes, LED viewing angle correction, and other functionality as disclosed herein, which may be implemented as instructions stored in the memory 304 and executed by the processor 302.

The memory 304 comprises one or more disks, tape drives, and/or solid-state drives and may be used as an over-flow data storage device, to store programs when such programs are selected for execution, and to store instructions and data that are read during program execution. The memory 304 may be volatile and/or non-volatile and may be read-only memory (ROM), random access memory (RAM), and/or static random-access memory (SRAM).

As used herein, the term 'display system' refers to an LED viewing angle correction system according to the disclosure. In various embodiments, elements of the display system may include some or all of the screen processors 106 and 126 and internal processing systems in the video display screens 102 and 122 and/or their LED panels (if any). In various embodiments, processing attributed below to the display system may be performed in a single element of an LED viewing angle correction system according to the disclosure or be distributed across multiple elements of such a system.

LED viewing angle correction according to the disclosure may be performed within the display system. The display system has a large amount of relevant information about the LEDs that form the display. During the process to gather such information (e.g., when a new panel type is integrated into the display system), additional information may be gathered regarding, for example, radiation patterns of RGB LEDs of the new panel type, which may be obtained via testing. When viewing angle correction is performed at certain points in the display system's video processing pipeline, the video signal may be (a) in a linear light format (i.e., not gamma-encoded), and (b) in a native colour space of the LEDs. Such conditions make it possible to implement the viewing angle correction (a) using linear computations, and (b) independently for each of the R, G, and B LEDs.

When the internal precision (or bit depth) of the video signal within the display system is substantially higher than the bit depth of the video signal, precision may be maintained when making small gain adjustments that vary gradually across the surface of a display. In contrast, making such adjustments in the video signal prior to the display system may lead to banding appearing in the image due to the more limited bit depth of the video signal.

A display system according to the disclosure performs LED viewing angle correction on a per-pixel basis. The appropriate correction for a pixel differs based on viewing angle, which itself is different for each pixel. By applying viewing angle correction on a per-pixel basis, rather than per-LED-panel, the correction is applied smoothly across the surface of the display and discontinuities in visual output are reduced.

Furthermore, applying viewing angle correction that is adjusted as a viewer of the LED display (such as a camera) moves position to maintain the desired correction. In contrast, a static correction can only compensate for a single viewer position and would not be desirable for use with a moving viewer. Thus, an LED viewing angle correction system according to the disclosure provides real-time, per-pixel correction within the display system itself, thereby reducing the drawbacks of alternative approaches.

Automated Measurement of LED Panels

A reference LED panel may be located in a dark environment at a stable temperature. In various embodiments, multiple panels, a single module of the panel, or even a single LED of the type used in the reference panel may be used. However, in a preferred embodiment, a full panel is used. The remainder of the automated measurement process is described assuming the use of a single panel, though a similar process could be used for each of the other cases.

A suitable measurement instrument is selected, such as a spectroradiometer, colorimeter, or light meter. Independent measurement of individual colors of a multi-color LED may be obtained by individually illuminating each colour of LED. However, some instruments (such as a spectroradiometer or some colorimeters) allow taking a single measurement of the panel illuminating all colours simultaneously (or 'displaying white') from which the independent brightness of each LED colour may be calculated. Such an approach has the potential to speed up the measurement process by around a factor of three.

A series of measurements may be taken to determine a two-dimensional (2D) emission pattern of the panel. Such a procedure includes adjusting the orientation of the panel relative to the measurement instrument between measurements. In some embodiments this is achieved by keeping the measurement instrument static and rotating the panel about its centre along two orthogonal axes that are parallel to the plane of the panel. In other embodiments this is achieved by keeping the panel static and adjusting the location and orientation of the measurement instrument such that it remains a fixed distance from the centre of the panel, oriented towards the centre of the panel, and at the desired heading and pitch (horizontal and vertical angle) to the surface of the panel. In still other embodiments, one or more mirrors (fixed or moving) may be employed to similarly adjust the orientation of the panel relative to the measurement instrument, either in conjunction with moving the panel and/or measurement instrument, or by keeping the panel and measurement instrument static and only moving the mirror or mirrors.

In some embodiments, the process of obtaining the series of measurements is performed by an automated system. In this way a large number of accurately positioned measurements can be taken without the need for human intervention. In other embodiments, a measurement instrument is employed which is capable of simultaneously measuring light emitted in multiple directions, thereby reducing or eliminating the need to move or rotate either the panel or the measurement instrument. Such embodiments may include a plurality of spaced-apart sensors configured to make simultaneous measurements from a corresponding plurality of angles.

Because the brightness of the LEDs may vary over time (for example due to changing temperature or power supply voltage/current), in some embodiments a single 'reference measurement' may periodically be taken with the panel and measurement instrument aligned 'straight-on' (i.e. perpendicular to the face of the panel). The 'off axis' measurements can be compared back to this reference measurement to determine the effect of off-axis viewing without inadvertently measuring differences due to other effects. In some such embodiments, every off-axis measurement is followed by a 'straight-on' reference measurement so the two can be compared. In other such embodiments, fewer 'straight-on' measurements are taken, and a representative reference value is calculated by interpolating between the previous and next 'straight-on' measurements, based on how much time has passed at the point when the off-axis measurement is taken. In still other such embodiments, a permanently installed second measurement instrument is used to take 'straight-on' measurements, while compensating for any source of errors between the readings from the two instruments.

In some embodiments, measurements are taken at fixed angles horizontally and vertically, e.g., at every 6 degrees horizontally and vertically across a hemisphere. As measurements parallel to the plane of the panel will not yield useful results (i.e. at +90 and −90) such embodiments would obtain an array of 29×29 measurements in total (excluding reference measurements), covering −84 to +84 degrees. Some such embodiments extrapolate from the actual measurements to deduce appropriate values at −90 and +90 degrees.

Measurements are anticipated to be made primarily of the brightness of the R, G, and B LEDs. However, where a colour shift of a single LED colour is observed (e.g. due to optical properties of the lens or a surface coating), an embodiment may record both brightness and colour at each point.

Depending on the measurement instrument selected, a measurement area on the panel may vary depending on the viewing angle of the instrument. For example, a straight-on measurement might measure a circular area, while off-axis measurements might measure elliptical areas. Some embodiments may compensate computationally for such variation in measurement area. Other embodiments may illuminate only a subset of the LEDs so that the same LEDs are viewed by the measurement instrument regardless of the viewing angle. In embodiments where the measurement area is sharply focused, any LED can quickly transition from 'inside' to 'outside' the measurement area. In such embodiments, steps are taken to avoid aliasing artefacts, which may increase the measurement error due to the panel not being a uniformly emitting surface but an array of bright dots with dark areas between them.

Measurements for various panel types may be made and stored as pixel gain maps in a library on a portable disk or in an Internet-accessible server, indexed by the panel type and the viewing angle for each measurement. In this way, measurement maps may be made available for configuring LED viewing angle correction systems according to the disclosure.

Pixel Gain Table

Once viewing angle measurement data has been captured, it may be converted to a pixel gain table, for example, by adjusting the number of sample points, normalising the data, and/or otherwise improving the data for storage, transmission, and/or use in an LED viewing angle correction system according to the disclosure.

Such a pixel gain table is shown in Table 1, with each entry in the form of 'Red Gain, Green Gain, Blue Gain'. For example, at a viewing angle of +45° (Right) and +45° (Above), Red Gain is 1.55, Green Gain is 1.37, and Blue Gain is 1.22. These gains are the factors by which the brightness of the RGB LEDs of a pixel viewed from 45° to the right and 45° above must be increased to appear to the viewer at the same brightness of a pixel viewed straight-on (i.e., at 0° and 0°).

TABLE 1

|  | −90° (Left) | −45° (Left) | 0° (Perpendicular) | +45° (Right) | +90° (Right) |
|---|---|---|---|---|---|
| +90° (Above) | 3.27, 1.78, 1.64 | 2.86, 1.64, 1.37 | 2.52, 1.4, 1.17 | 2.95, 1.64, 1.35 | 3.52, 1.78, 1.55 |
| +45° (Above) | 1.72, 1.49, 1.49 | 1.5, 1.37, 1.25 | 1.32, 1.17, 1.06 | 1.55, 1.37, 1.22 | 1.85, 1.49, 1.41 |
| 0° (Perpendicular) | 1.3, 1.28, 1.4 | 1.13, 1.17, 1.17 | 1.0, 1.0, 1.0 | 1.17, 1.17, 1.15 | 1.4, 1.28, 1.32 |
| −45° (Below) | 1.4, 1.49, 1.75 | 1.22, 1.37, 1.47 | 1.08, 1.17, 1.25 | 1.26, 1.37, 1.44 | 1.51, 1.49, 1.66 |
| −90° (Below) | 1.57, 1.78, 2.61 | 1.37, 1.64, 2.18 | 1.21, 1.4, 1.87 | 1.42, 1.64, 2.15 | 1.69, 1.78, 2.47 |

Such pixel gain tables may be included in a panel library for use by an LED viewing angle correction system according to the disclosure, the library containing definitions for panel types supported by the correction system. From this library, 'packs' may be generated that contain, for example, firmware implementing an LED viewing angle correction system according to the disclosure, as well as panel definitions for some or all of the supported panel types. For panels where pixel gain tables are available, they may be included in the resulting 'pack'.

The pack may then be loaded onto a processor of the system (or into a personal computer (PC)-based application) which may be used to upgrade the firmware on the panels. The process of upgrading the panel firmware may also transfer the relevant panel definition alongside the firmware image, as well as the viewing angle measurement data and/or pixel gain tables. The data for any given panel type could thus be loaded onto all panels of that type via a firmware update.

Screen/Panel Geometry

Viewing angle calculations are based on the 3D location and orientation of one or more of video screens, their component LED panels, and their component LEDs within 3D space. The orientation of the video screen, LED panel, and LEDs may be represented by optical axis vectors of the LEDs. LEDs in a planar panel are likely to have a common optical axis vector, but LEDs in a curved panel will have optical axis vectors that differ between one portion of the panel and another. Similarly, LED panels or video screens mounted at an angle to each other will likely have LEDs with differing optical axis vectors. Information relating to 3D location and LED optical axis vectors may be referred to as screen geometry information or panel geometry information. Screen geometry information may also include the width and height of LED panels or video screens, as well as the numbers of rows and columns of LED pixels in the panels or screens.

Screen geometry information may be obtained (or received) by an LED viewing angle correction system according to the disclosure in several ways or in a combination of two or more of the following ways. The LED viewing angle correction system may transform received screen geometry information from a coordinate system used by an originating system to a coordinate system used by the LED viewing angle correction system.

A screen processor may have a video canvas describing the surface of the display area and screen geometry information for individual video screens and/or LED panels may be inferred from the 3D definition of the video canvas. Static screen geometry information may be imported from an external system, such as a file import from a real-time 3D engine or a computer-aided design (CAD) system.

In some applications, screens and/or panels move during use, and a stream of real-time screen geometry information may be received by an LED viewing angle correction system according to the disclosure. In some cases, such movement may be under the control of a computer-based motion control system, which provides the stream of updates. In other cases, the motion results from other causes and the stream of updates comes from a live object tracking system. For either static or moving video screens and/or LED panels, the screen geometry information may be received from an automated system employing computer vision techniques, such as image recognition, machine-readable patterns, or structured light patterns.

Where viewing angle correction is performed by the LED panels or video screens, rather than by a central processor, panels or screens are sent screen geometry information relevant to their own location and orientation from a central screen processor via an Ethernet or other communication link. Such transfer might occur only once, at start-up, for a static panel configuration, or it might occur repeatedly for a dynamic configuration of panels. Panels may have information relating to their physical size and number of pixels pre-loaded and not need such information to be separately communicated.

Viewer/Camera Position

Viewing angle calculations are also based on the 3D location (or position) of a viewer of the LED panels or video screens. Such a viewer is often a camera, but in other circumstances may be one or more audience members or a person in a motion-controlled theme park ride.

Viewer position information may be obtained (or received) by an LED viewing angle correction system according to the disclosure in several ways or in a combination of two or more of the following ways. The LED viewing angle correction system may transform received viewer position information from a coordinate system used by an originating system to a coordinate system used by the LED viewing angle correction system. The LED viewing angle correction system may use the same coordinate system for both the screen geometry information and the viewer position information.

In some embodiments, an LED viewing angle correction system according to the disclosure may estimate viewer position information based upon known video screen or LED panel metrics such as LED pixel pitch (or distance between LED pixels), which might suggest an optimal viewing distance at which individual pixels are no longer visible to the human eye. For example, a 3 millimeter (mm) pixel pitch screen might be deemed to have a nominal viewing distance of 3 metre (m) for the individual pixels to not be visible, so the estimated viewing position might be a point located 3m orthogonally away from the centre of the screen.

In other embodiments, graphical user interface (GUI) controls enable a user to enter viewer position information (for example, as a point in 3D space or as a distance and direction from a point on the screen) for a static viewer. The entered viewer position information is then obtained or received by the LED viewing angle correction system. Some such embodiments may provide support for a dynamic viewer position by allowing entry of varying positions on a timeline. This might be useful in applications where the viewer position information changes in a predictable but repeatable way that does not require the use of a real-time tracking system (such as a motion-controlled theme park ride).

In still other embodiments, the LED viewing angle correction system receives a stream of viewer position information from the content generation system that is rendering the 3D environment in real-time. In such embodiments, the content generation system has a model of the location of the viewer, to allow it to render the content from the correct perspective. As such, the content generation system may transmit the modelled viewer position information to the LED viewing angle correction system. Such viewer position information may be static or dynamic. In various such embodiments, the viewer position information may be encoded within the video signal (e.g., by using high definition multimedia interface (HDMI) InfoFrames) or as an independent signal (e.g., across an Ethernet network or serial data connection).

In yet other embodiments, a dedicated camera tracking system may provide static or dynamic viewer position information. This might be a system that is also providing such data to a content generation system, or it might be an entirely independent system.

In embodiments that are receiving dynamic viewer position information from a camera tracking system, the LED viewing angle correction system may apply latency adjustment to the incoming stream of viewer position information. Such latency adjustment could approximate the latency of the content generation system, which is using the same or a similar incoming stream of viewer position information, but produces a stream of video content that lags changes in viewer position information by an amount of time (which may be a few video frames) that is required to render the video content stream. In such embodiments, delaying the viewer position data stream by a similar amount of time before using it to perform viewing angle corrections would provide a closer synchronization (or 'time alignment') between the rendered imagery and the viewing angle correction. In other such embodiments, latency may be compensated for by estimating current or future viewer position information based on previous viewer position information.

Where viewing angle correction is performed by the LED panels or video screens, rather than by a central processor, panels or screens are sent viewer position information from a central screen processor via an Ethernet or other communication link. Such transfer might occur only once for a static viewer position or it might be a stream of viewer position information.

As the same viewer position information is sent to all panels or screens, the information may be broadcast, rather than being sent to the panels' or screens' individual addresses. Broadcasting viewer position information has the further benefit that all panels or screens receive the updated information simultaneously, allowing each panel or screen to calculate viewing angle correction in parallel and begin applying an updated correction starting on the same video frame. This avoids a visual effect referred to as 'tearing' between panels that occurs if the application of updated correction is not synchronized between panels or screens.

Viewing Angle Calculation

An LED viewing angle correction system according to the disclosure may calculate a viewing angle for each LED pixel based on screen geometry information and viewer position information, which may include LED panel or video screen physical width and height, a number of rows and columns of LED pixels in the panels or screens, 3D locations and LED optical axis vectors of the panels or screens, and a 3D location of a viewer of the panels or screens.

The viewing angle correction system applies geometric techniques to determine horizontal and vertical angles (heading and pitch respectively) between the viewer and each LED pixel on the panel or screen. For example, the horizontal and vertical angles from the LED to the viewer can be calculated as:

$$\theta_{horizontal} = \tan^{-1}\left(\frac{viewer_x - pixel_x}{viewer_z - pixel_z}\right) \text{ and } \theta_{vertical} = \tan^{-1}\left(\frac{viewer_y - pixel_y}{viewer_z - pixel_z}\right)$$

where $viewer_z - pixel_z > 0$ (i.e. the viewer is in front of the panel, not behind it), the x and y axes are aligned respectively to the panel surface's horizontal and vertical vectors and the z axis is orthogonal to the panel surface.

In some embodiments, to reduce the computation complexity, the panel might calculate heading and pitch for a subset of the LED pixels on the panel or screen. In general, but particularly when the viewer is located relatively distant to the panel, the heading and pitch for the remaining LED pixels may be calculated by interpolating between the values calculated for the subset of LED pixels. In some such embodiments, the subset might include every 'one in n' pixels horizontally and vertically (i.e. a regular grid). Some such embodiments may implement a split between software-based calculation for the subset of pixels and FPGA-based (or other coprocessor hardware) calculation for the interpolation for the remaining pixels. Such interpolation might be linear (to provide calculation efficiency) or non-linear (to better model the variation in viewing angle between pixels). If the subset comprises pixels spaced in a regular grid, an appropriate linear approach might be bilinear interpolation, while an appropriate non-linear approach might be bicubic interpolation.

In some such embodiments, to reduce calculation time and storage requirements, the viewing angles for only the subset of LED pixels are calculated and stored for use in calculating RGB gain factors, as described in more detail below.

Recalculation of viewing angles for LED pixels may be performed whenever screen geometry information or viewer position changes. When the LED panels and video screens and the viewer position are static, recalculation may not be needed. While LED panels and video screens may remain static, it is likely that the camera (or other viewer) will move, resulting in recalculation of viewing angles for the LED pixels.

RGB Correction Calculation

Once heading and pitch have been calculated for an LED pixel, RGB gain factors may be calculated therefrom and applied to RGB brightness values for a corresponding video pixel of a frame of video data to calculate compensated brightness values for RGB LEDs of the LED pixel. In some embodiments, this gain factor comes from a pixel gain table such as Table 1, above. The disclosure herein describes LED pixels having RGB LEDs, but in other embodiments, the same process may be used for LED pixels emitting one, two, or more than three colors.

In some embodiments, RGB gain factors in the pixel gain table may have values greater than 1.0, to enable boosting the brightness of LED pixels when viewed off-axis, as compared to their brightness when viewed straight-on. Such embodiments would leave LED pixel brightness unchanged when viewed straight-on and only compensate LED pixel brightness for off-axis viewing. In other embodiments, RGB gain factors in the pixel gain table may be normalised so that all values are ≤1.0.

In some embodiments, gain factors in the pixel gain table are stored for uniformly spaced viewing angles. In other embodiments, gain factors may be stored for non-uniformly spaced viewing angles. In such embodiments, a higher concentration of viewing angles close to the orthogonal (straight-on) viewing angle may have gain factors stored, with gain factors stored for fewer extreme viewing angles.

Because the pixel gain table does not include gain factors for every possible viewing angle, an LED viewing angle correction system according to the disclosure will interpolate between the gain factors stored in the table to calculate gain factors that transition smoothly as the viewing angle changes. In some embodiments, the interpolation might be bi-linear for ease of computation, while in others it might use non-linear function, such as bicubic or spline-based interpolation.

As described above, in some embodiments viewing angles for only a subset of LED pixels are calculated and stored. In such embodiments, RGB gain factors for the LED pixels in the subset are calculated from the stored viewing angles and RGB gain factors for LED pixels not in the subset are calculated by interpolating between RGB gain factors of two or more of the LED pixels in the subset.

In some embodiments, a compensation strength control parameter is provided, to scale the amount of viewing angle correction from 0% (no correction) and 100% (full correction). In some such embodiments, the gain factor from the pixel gain table may be scaled between 1.0 and the value stored in the table before being applied to the video pixels' brightness values. In other such embodiments, once the video pixels' brightness values have been adjusted using the gain factor from the pixel gain table, the value of the compensation strength control parameter is used to interpolate between the original brightness values of the video pixels and the adjusted values to create compensated brightness values for the corresponding LED pixels.

As described above, compensated RGB brightness values for the RGB LEDs of an LED pixel are calculated based on the RGB gain factor and RGB brightness values for a corresponding video pixel in a received video signal. In some embodiments, this compensation is performed for all video pixels in a frame to create a frame of compensated video data that is sent to an LED panel and/or video screen, causing its LED pixels to emit light having the compensated pixel brightness. In other embodiments, the compensation is performed in an LED panel or video screen on a received video frame on a pixel-by-pixel basis for each video pixel that corresponds to an LED pixel of the LED panel or video screen. Such embodiments may compensate video pixels in a raster scan order or in an arbitrary order. The corresponding LED pixel is then caused to emit light having the compensated video pixel brightness.

An LED viewing angle correction system according to the disclosure performs pixel brightness compensation at a precision (in terms of number of bits) that is equal to or greater than the maximum bit depth of the video signal. In this way, representation of the compensated video pixel brightness is sufficiently accurate to avoid artefacts such as colour shifts due to loss of precision. In some embodiments, video pixel brightness levels are transformed from video levels (e.g. gamma-encoded levels) to linear brightness levels prior to compensation. In embodiments where the pixel gain table includes RGB gain factors greater than 1.0, values of compensated video pixel brightness for one or more of the RGB LEDs of an LED pixel may exceed the maximum luminance available from the LEDs of the LED pixel. In some such embodiments, the compensated video pixel brightness may be 'clipped' to the maximum luminance available from those LEDs of the LED pixel.

The result of implementing the above LED viewing angle correction system according to the disclosure will be a display system that can react in real-time to the position of a viewer to compensate for RGB LED viewing-angle deficiencies, thereby improving brightness and colour accuracy across the entire screen, even when there are discontinuities in the screen geometry. This minimises the visibility of the screen technology itself, reducing its effect on the intended virtual environment visible to the viewer.

Other Embodiments

In some embodiments, measurements may be taken to determine a 2D emission pattern of each LED pixel of an LED panel and converted into a pixel gain table for each LED pixel. Such embodiments would provide improved correction for displays where the LED pixels are non-homogeneous. In some such embodiments, measurements may be taken on a subset of the LED pixels of an LED panel and pixel gain tables stored for each LED pixel in the subset. LED pixels in the panel that are not in the subset may be individually measured and compared to LED pixels in the subset to find an LED pixel with the closest 2D emission pattern. Rather than storing an individual pixel gain table for LED pixels not in the subset, an identifier of an LED pixel in the subset with the closest 2D emission pattern is stored. Such embodiments would use less storage space than embodiments storing an individual pixel gain table for each LED pixel.

In some embodiments, LED pixels may exhibit a variation in central optical axis between individual LED pixels. For example, this may occur when the LED pixels are identical, but are mounted on a printed circuit board (PCB) of the LED panel at slightly different angles. Such embodiments may measure a 2D emission pattern of the panel as a whole and apply per-pixel 'offsets' to the viewing angles to compensate for the central optical axis variations.

Embodiments adapted for multiple viewers (such as multiple cameras, or a single camera and a reflective object in the scene), may calculate a compensation that is not ideal for either viewer, but is a 'better fit' for all the viewers. Some such embodiments may use consolidated viewer position information that is an average of the multiple viewers' locations, possibly a weighted average if some viewers are considered more important than others. Other such embodiments may calculate compensations independently for each viewer and then average the resulting compensations. Such embodiments may provide better results than averaging the viewer locations, as they take account of the RGB gain compensation effect of each viewer being in a different location.

In still other embodiments, the LED screen is capable of displaying independent images for each of a plurality of viewers, such as by time-division multiplexing (via Liquid Crystal Display (LCD) shutter glasses or synchronized cameras), polarization (via circular or linear polarization filters), light fields (via lenticular lenses, optical baffles or holographic filters), or other techniques. In such embodiments, a unique correction may be calculated for each viewing position, with each resulting correction applied only to each corresponding displayed image, thus correcting the display system's output simultaneously and independently for a plurality of viewers.

In other embodiments, the gain factors in the pixel gain table may be implemented as a 3×3 matrix for RGB values of LED pixel brightness, providing compensation not only for brightness changes with viewing angle, but also for colour changes. Such an embodiment may be used where changing the viewing angle of the LED pixels results in perceived changes in the colour (spectral output) as well as the brightness (amplitude) of the LED pixels. In such embodiments, compensation is applied by matrix multiplication of an RGB video pixel brightness by the pixel gain table matrix value, interpolated for actual viewing angle.

For example, the 3×3 matrix for a given viewing angle shown in Table 2 would not only apply gains of 4, 3, 2 to red, green and blue, respectively, but also make both the red and green more yellow, while not affecting the colour of the blue output:

TABLE 2

| 4.0 | 0.2 | 0.0 |
| 0.4 | 3.0 | 0.0 |
| 0.0 | 0.0 | 2.0 |

Although the embodiment described above includes pixels comprising 3 colors of LEDs:, the invention is not so limited and any number of LEDs of any number of colours may be used within the LED panels.

Figure 4:
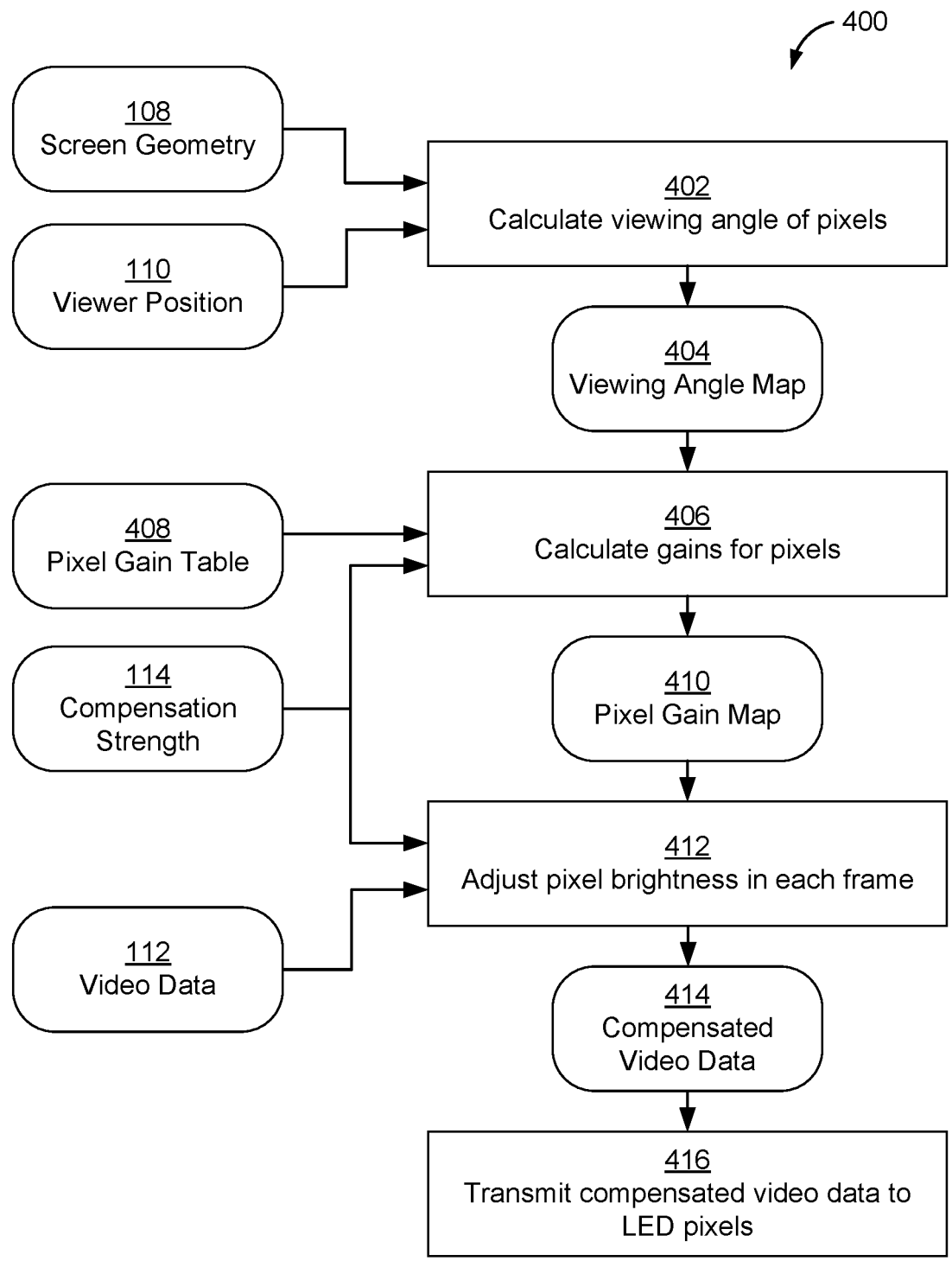
FIG. 4 is a flow diagram of a first LED viewing angle correction process according to an embodiment of the disclosure.

FIG. 4 is a flow diagram of a first LED viewing angle correction process 400 according to an embodiment of the disclosure. Referring to elements of the display system shown in FIGS. 1 and 3, the process 400 is suitable for use by the controller 300 of the screen processor 106 in controlling RGB brightness of LED pixels in video screen 102, where neither the video screen nor its component LED panels (such as LED panels 102a and 102b) has sufficient processing power to perform an LED viewing angle correction process according to the disclosure. The processor 302 executes instructions stored in the memory 304 to perform the process 400.

In step 402, a viewing angle map 404 is generated, based on the screen geometry information 108 and the viewer position information 110. The viewing angle map 404 comprises individual viewing angles for the LED pixels. The screen geometry information 108 comprises information that relates to three-dimensional (3D) locations and optical axis vectors for the LED pixels of the video display screen 102. The viewer position information 110 comprises information that relates to a 3D location of a viewer of the video display screen 102. In some embodiments, the viewer position information 110 comprises a plurality of 3D locations of a corresponding plurality of viewers of the video display screen 102 and, in step 402, consolidated viewer position information is calculated from the plurality of 3D locations in the viewer position information 110.

In some embodiments, in step 402 individual viewing angles for a subset of the LED pixels are calculated, based on the screen geometry information 108 and the viewer position information 110. In some such embodiments, individual viewing angles for LED pixels not in the subset are calculated by interpolating between the individual viewing angles of two or more of the LED pixels in the subset. In other such embodiments, the viewing angle map 404 includes only the viewing angles for the LED pixels in the subset.

In step 406, a pixel gain map 410 is generated based on the viewing angle map 404 and the pixel gain table 408. The pixel gain map 410 comprises individual pixel gain factors for the LED pixels of the video display screen 102 and the pixel gain table 408 comprises information that relates to a relationship between pixel intensity and pixel viewing angle for the LED pixels.

In embodiments where the LED pixels of the video display screen 102 emit light in a plurality of colors, the pixel gain map 410 may comprise individual gain factors for each of the plurality of colors emitted by the LED pixels. In some embodiments, gain factors from the pixel gain table 408 or individual pixel gain factors of the pixel gain map 410 are scaled by the compensation strength control parameter 114.

In some embodiments, the pixel gain table 408 comprises a lookup table that includes a pixel gain factor for each of a plurality of viewing angles. In such embodiments, in step 406 the individual pixel gain factors for one or more of the LED pixels of the video display screen 102 are calculated by interpolating between pixel gain factors for two or more of the individual viewing angles in the pixel gain table 408 based on the viewing angle for each of the one or more LED pixels in the viewing angle map 404.

When either or both of the screen geometry information 108 and the viewer position information 110 change, step 402 is repeated to calculate a new viewing angle map 404 and step 406 is repeated to calculate a new pixel gain map 410.

In some embodiments, pixel gain factors for a subset of LED pixels may be calculated based on the viewing angle map 404 and the pixel gain table 408. In some such embodiments, where viewing angles for only a subset of the LED pixels are stored in the viewing angle map 404 in step 402, in step 406 pixel gain factors are calculated for that subset of LED pixels. In other such embodiments, where viewing angles for all of the LED pixels are stored in the viewing angle map 404 in step 402, in step 406 the subset of the LED pixels is selected and pixel gain factors are calculated therefor. In all such embodiments, pixel gain factors for LED pixels not in the subset are calculated by interpolation between pixel gain factors for two or more LED pixels in the subset.

In step 412, frames of compensated video data 414 are generated from the video data 112 by calculating compensated video pixel brightness in received frames of a video signal based on the pixel gain map. In some embodiments, generation of compensated video data 414 includes interpolating between the original brightness values of the received video pixels and compensated brightness values based on the compensation strength control parameter 114. In step 416, the frames of compensated video data 414 are transmitted to the video display screen 102 (or to its individual LED panels) and are configured to cause LED pixels of the video display screen 102 to emit light having a brightness as specified in corresponding video pixels of the compensated video data 414.

Figure 5:
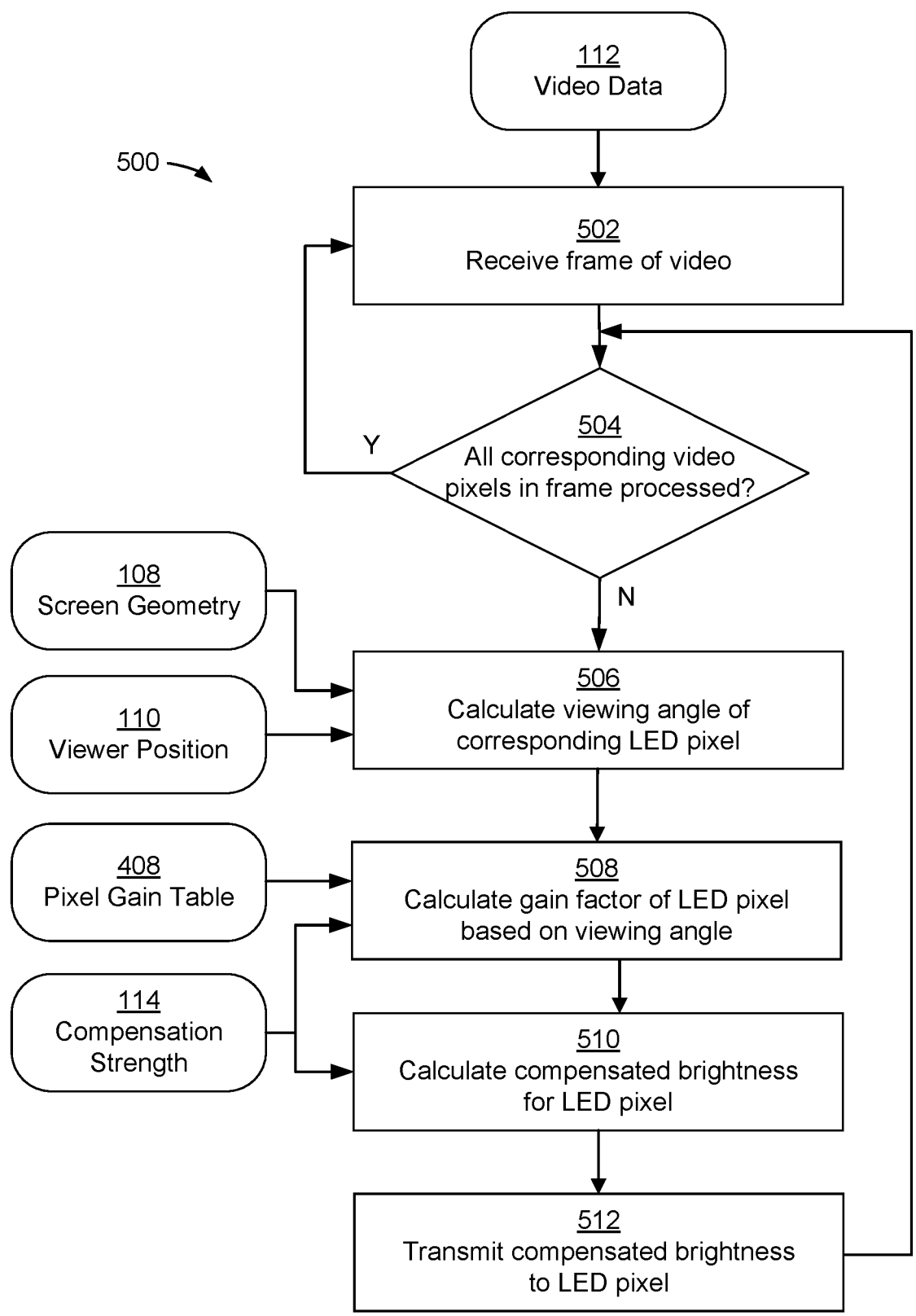
FIG. 5 is a flow diagram of a second LED viewing angle correction process according to an embodiment of the disclosure.

FIG. 5 is a flow diagram of a second LED viewing angle correction process 500 according to an embodiment of the disclosure. The process 500 is suitable for use by the controller 300 of the LED panel 102a or the video display screen 102 that receives uncompensated video data and compensates those video pixels that correspond to LED pixels of the LED panel 102a or the video display screen 102. The processor 302 executes instructions stored in the memory 304 to perform the process 500.

In step 502, a frame of video data 112 is received. Step 504 begins a pixel-by-pixel processing loop. Video pixels of the received frame may be compensated in a raster scan order or in an arbitrary order, as described below. In step 504, a determination is made whether all video pixels of the received frame of video data 112 that correspond to LED pixels of the LED panel 102a or the video display screen 102 have been processed and, if so, the process 500 goes to step 502 to await the next frame of video data 112.

If all corresponding video pixels of the received frame of video data have not been processed, then in step 506 processing begins on a next unprocessed video pixel by calculating a viewing angle of the LED pixel that corresponds to the video pixel being processed. The LED pixel viewing angle is calculated based on the screen geometry information 108 and the viewer position information 110. The screen geometry information 108 comprises information that relates to three-dimensional (3D) locations and optical axis vectors for the LED pixels of the video display screen 102. The viewer position information 110 comprises information that relates to a 3D location of a viewer of the video display screen 102.

In some embodiments, the viewer position information 110 comprises a plurality of 3D locations of a corresponding plurality of viewers and, in step 506, consolidated viewer position information is calculated from the plurality of 3D locations in the viewer position information 110. In some embodiments, the process 500 compensates all corresponding video pixels in a frame before commencing to use either newly received screen geometry information 108 or newly received viewer position information 110 (which may be referred to collectively as "received information").

In step 508, a gain factor is calculated for the LED pixel that corresponds to the video pixel being processed. The gain factor is calculated based on the LED pixel viewing angle calculated in step 506 and the pixel gain table 408. The pixel gain table 408 comprises information that relates to a relationship between pixel intensity and pixel viewing angle for the LED pixels.

In embodiments where the LED pixels of the video display screen 102 emit light in a plurality of colors, the gain factor for the LED pixel may comprise individual gain factors for each of the plurality of colors emitted by the LED pixel. In some embodiments, gain factors from the pixel gain table 408 or the gain factor calculated for the LED pixel may be scaled by a compensation strength control parameter 114.

In some embodiments, the pixel gain table 408 comprises a lookup table that includes a pixel gain factor for each of a plurality of viewing angles. In such embodiments, in step 508 the pixel gain factor for the LED pixel is calculated by interpolating between pixel gain factors for two or more of the individual viewing angles in the pixel gain table 408 based on the viewing angle of the LED pixel calculated in step 506.

In step 510, a compensated brightness is calculated for the LED pixel that corresponds to the video pixel being processed. The compensated brightness is based on the gain factor calculated in step 508 and a brightness value of the video pixel being processed. In embodiments where the LED pixels of the video display screen 102 emit light in a plurality of colors, the compensated brightness for an LED pixel comprises an individual brightness for each of the plurality of colors. In some embodiments, calculating the compensated brightness includes interpolating based on the compensation strength control parameter 114 between the brightness value of the video pixel being processed and the compensated brightness value calculated based on the gain factor and the video pixel brightness value. In step 512, the compensated brightness for the LED pixel is transmitted to a power control circuit for the LED pixel to cause the LED pixel to emit light having the compensated brightness.

In some embodiments, the frame of video data 112 received in step 502 is stored and video pixels from the frame are compensated in an arbitrary order. In some such embodiments, a subset of video pixels in the frame are selected for processing and steps 506, 508, 510, and 512 are performed for the video pixels in the subset.

In some such embodiments, values of viewing angle of the LED pixels that correspond to the video pixels in the subset are stored as step 506 is performed for the video pixels in the subset. Subsequently, when step 506 is performed for a video pixel not in the subset, a viewing angle of the LED pixel that corresponds to the video pixel is calculated by interpolating between the stored viewing angles for two or more of the video pixels in the subset.

In other such embodiments, values of pixel gain factor for the LED pixels that correspond to the video pixels in the subset are stored as step 508 is performed for the video pixels in the subset. Subsequently, when step 508 is performed for a video pixel not in the subset, a pixel gain factor of the LED pixel that corresponds to the video pixel is calculated by interpolating between the stored pixel gain factors for two or more of the video pixels in the subset.

Figure 6:
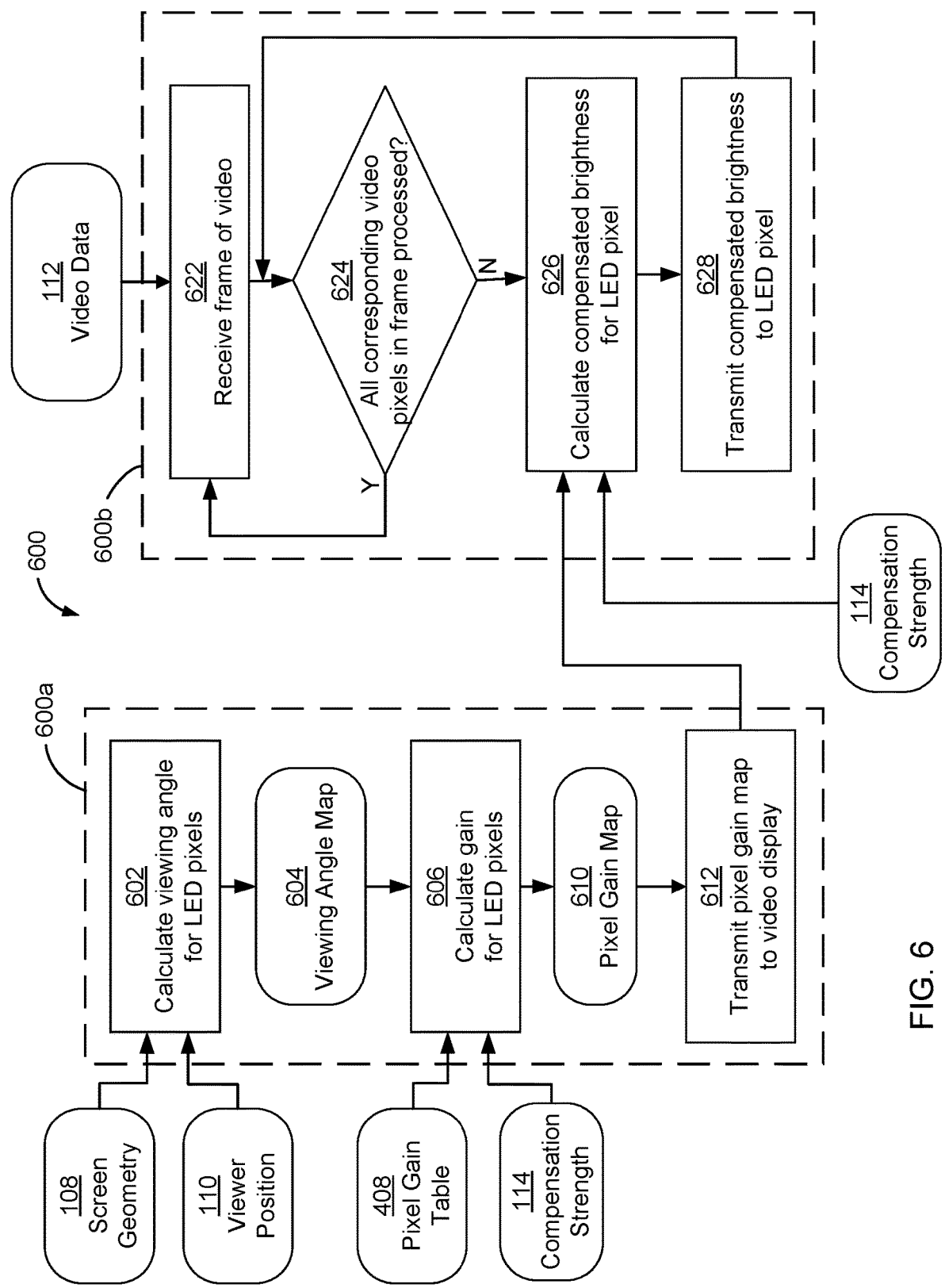
FIG. 6 is a flow diagram of a third LED viewing angle correction process according to an embodiment of the disclosure.

FIG. 6 is a flow diagram of a third LED viewing angle correction process 600 according to an embodiment of the disclosure. The process 600 comprises two subprocesses, 600a and 600b. The subprocess 600a is suitable for use by the controller 300 of the screen processor 106 in transmitting a pixel gain map 610 to the LED panel 102a or the video display screen 102. The subprocess 600b is suitable for use by the controller 300 of the LED panel 102a or the video display screen 102 that receives uncompensated video data and the pixel gain map 610 and, based on the pixel gain map 610, compensates the received video pixels that correspond to LED pixels of the LED panel 102a or the video display screen 102. The processor 302 of the controller 300 in the screen processor 106 and the LED panel 102a or the video display screen 102 execute instructions stored in the memories 304 to perform the subprocesses 600a and 600b.

In step 602, a viewing angle map 604 is generated, based on the screen geometry information 108 and the viewer position information 110. The viewing angle map 604 comprises individual viewing angles for the LED pixels. The screen geometry information 108 comprises information that relates to three-dimensional (3D) locations and optical axis vectors for the LED pixels of the video display screen 102. The viewer position information 110 comprises information that relates to a 3D location of a viewer of the video display screen 102. In some embodiments, the viewer position information 110 comprises a plurality of 3D locations of a corresponding plurality of viewers and, in step 602, consolidated viewer position information is calculated from the plurality of 3D locations in the viewer position information 110.

In some embodiments, in step 602 individual viewing angles for a subset of the LED pixels are calculated, based on the screen geometry information 108 and the viewer position information 110 and individual viewing angles for LED pixels not in the subset are calculated by interpolating between the individual viewing angles of two or more of LED pixels in the subset.

In step 606, a pixel gain map 610 is generated based on the viewing angle map 604 and the pixel gain table 408. The pixel gain map 610 comprises individual pixel gain factors for the LED pixels of the video display screen 102 and the pixel gain table 408 comprises information that relates to a relationship between pixel intensity and pixel viewing angle for the LED pixels. In step 612, the pixel gain map 610 is transmitted to one or more LED panels 102a, 102b or video display screens 102, 122 and is configured to cause the LED panels 102a, 102b and/or video display screens 102, 122 to compensate pixel brightness of received frames of a video signal based on the pixel gain map 610.

In embodiments where the LED pixels of the video display screen 102 emit light in a plurality of colors, the pixel gain map 610 may comprise individual gain factors for each of the plurality of colors emitted by the LED pixels. In some embodiments, gain factors from the pixel gain table 408 or individual pixel gain factors of the pixel gain map 610 are scaled by the compensation strength control parameter 114.

In some embodiments, the pixel gain table 408 comprises a lookup table that includes a pixel gain factor for each of a plurality of viewing angles. In such embodiments, in step 606 the individual pixel gain factors for one or more of the LED pixels of the video display screen 102 are calculated by interpolating between pixel gain factors for two or more of the individual viewing angles in the pixel gain table 408 based on the viewing angle for each of the one or more LED pixels in the viewing angle map 604.

In step 622, a frame of video data 112 is received. Step 624 begins a pixel-by-pixel processing loop. In step 624, a determination is made whether all video pixels of the received frame of video data 112 that correspond to LED pixels of the LED panel 102a or the video display screen 102 have been processed and, if so, the subprocess 600b goes to step 622 to await the next frame of video data.

If all corresponding video pixels of the received frame of video data have not been processed, then in step 626 processing begins on a next unprocessed video pixel by calculating a compensated brightness for the LED pixel that corresponds to the video pixel being processed. The compensated brightness is based on the gain factor for the LED pixel in the pixel gain map 610 and a brightness value of the video pixel being processed. In some embodiments, calculating the compensated brightness includes interpolating based on the compensation strength control parameter 114 between the brightness value of the video pixel being processed and the compensated brightness value calculated based on the gain factor and the video pixel brightness value.

In some embodiments, the subprocess 600b compensates all corresponding video pixels in a frame with a current pixel gain map 610 before commencing to use a newly received pixel gain map 610. In step 628, the compensated brightness for the LED pixel is transmitted to a power control circuit for the LED pixel to cause the LED pixel to emit light having the compensated brightness.

While only some embodiments of the disclosure have been described herein, those skilled in the art, having benefit of this disclosure, will appreciate that other embodiments may be devised which do not depart from the scope of the disclosure. While the disclosure has been described in detail, it should be understood that various changes, substitutions and alterations can be made hereto without departing from the spirit and scope of the disclosure.

What is claimed is:

1. A video display device comprising:
   a plurality of light emitting diode (LED) pixels;
   a memory storing instructions; and
   a processor coupled to the plurality of LED pixels and the memory and configured to execute the instructions stored in the memory to:
   receive a frame of video data comprising a plurality of video pixels corresponding to the plurality of LED pixels; and
   for at least some video pixels in the frame corresponding to LED pixels in the plurality of LED pixels:
   calculate a viewing angle for the LED pixel ($\theta_{horizontal}$, $\theta_{vertical}$) based on (i) a three-dimensional (3D) location of the LED pixel ($pixel_x$, $pixel_y$, $pixel_z$) and (ii) a 3D location of a viewer of the LED pixel ($viewer_x$, $viewer_y$, $viewer_z$), where $\theta_{horizontal}$ is calculated from the values $pixel_x$, $pixel_z$, $viewer_x$, and $viewer_z$ and $\theta_{vertical}$ is calculated from the values $pixel_y$, $pixel_z$, $viewer_y$, and $viewer_z$;
   calculate a gain factor for the LED pixel based on the viewing angle ($\theta_{horizontal}$, $\theta_{vertical}$) and a pixel gain table comprising information relating to a relationship between pixel intensity and pixel viewing angle for the LED pixel;
   calculate a compensated brightness for the LED pixel based on the gain factor and a brightness of the video pixel; and
   cause the LED pixel to emit light having the compensated brightness.

2. The video display device of claim 1, wherein each LED pixel of the plurality of LED pixels emit light in a plurality of colors, the gain factor for the LED pixel comprises an individual gain factor for each color of the plurality of colors, and the compensated brightness for the LED pixel comprises an individual brightness for each of the plurality of colors.

3. The video display device of claim 1, wherein the at least some video pixels in the frame comprise a subset of the video pixels in the frame, and the processor is configured to execute the instructions stored in the memory to:
   store viewing angles for the LED pixels that correspond to the video pixels in the subset; and
   interpolate between two or more of the stored viewing angles to calculate the viewing angles for the LED pixels that correspond to the video pixels not in the subset.

4. The video display device of claim 1, wherein the at least some video pixels in the frame comprise a subset of the video pixels in the frame, and the processor is configured to execute the instructions stored in the memory to:
   store gain factors for the LED pixels that correspond to the video pixels in the subset; and
   interpolate between two or more of the stored gain factors to calculate the gain factors for the LED pixels not in the subset.

5. The video display device of claim 1, wherein:
   the pixel gain table comprises a lookup table including a pixel gain factor for each of a plurality of viewing angles; and
   the processor is configured to execute the instructions stored in the memory to interpolate between pixel gain factors for two or more of the plurality of viewing angles in the pixel gain table to calculate the gain factor for the LED pixel.

6. The video display device of claim 1, wherein the processor is configured to execute the instructions stored in the memory to calculate the viewer position information based on a plurality of 3D locations of a corresponding plurality of viewers of the plurality of LED pixels.

7. The video display device of claim 1, wherein the processor is configured to execute the instructions stored in the memory to calculate the gain factor for the LED pixel further based on a compensation strength control parameter.

8. A video processing device, comprising:
   a memory storing instructions; and
   a processor coupled to the memory and configured to execute the instructions stored in the memory to:
   generate a viewing angle map comprising individual viewing angles ($\theta_{horizontal}$, $\theta_{vertical}$) for each of a plurality of light emitting diode (LED) pixels of a video display device, the individual viewing angles based on (i) individual three-dimensional (3D) locations ($pixel_x$, $pixel_y$, $pixel_z$) of each LED pixel of the plurality of LED pixels and (ii) a 3D location of a viewer of the LED pixel ($viewer_x$, $viewer_y$, $viewer_z$), where $\theta_{horizontal}$ for the individual LED pixel is calculated from the values $pixel_x$, $pixel_z$, $viewer_x$, and $viewer_z$ and $\theta_{vertical}$ for the individual LED pixel is calculated from the values $pixel_y$, $pixel_z$, $viewer_y$, and $viewer_z$;
   generate a pixel gain map comprising individual gain factors for the plurality of LED pixels based on the individual viewing angles ($\theta_{horizontal}$, $\theta_{vertical}$) of the viewing angle map and a pixel gain table comprising information relating to a relationship between pixel intensity and pixel viewing angle for the LED pixels;
   generate frames of compensated video data by calculating compensated video pixel brightness in received frames of a video signal based on the pixel gain map; and
   transmit the frames of compensated video data to the video display device, the frames of compensated video data configured to cause the LED pixels to emit light having the compensated video pixel brightness of corresponding video pixels.

9. The video processing device of claim 8, wherein the LED pixels emit light in a plurality of colors and the pixel gain map comprises individual gain factors for each of the plurality of colors emitted by the LED pixels.

10. The video processing device of claim 8, wherein the processor is configured to execute the instructions stored in the memory to calculate the viewer position information based on a plurality of 3D locations of a corresponding plurality of viewers of the video display device.

11. The video processing device of claim 8, wherein the processor is configured to execute the instructions stored in the memory to:
   generate the viewing angle map for a subset of the LED pixels; and
   interpolate between the individual viewing angles for two or more of the LED pixels in the subset to calculate the individual viewing angles for the LED pixels not in the subset.

12. The video processing device of claim 8, wherein the processor is configured to execute the instructions stored in the memory to:
   generate the viewing angle map for a subset of the LED pixels;
   generate the pixel gain map for the subset of the LED pixels; and interpolate between the individual gain factors for two or more of the LED pixels in the pixel gain map to calculate the individual gain factors for the LED pixels not in the subset.

13. The video processing device of claim 8, wherein:

the pixel gain table comprises a lookup table including a pixel gain factor for each of a plurality of viewing angles; and the processor is configured to execute the instructions stored in the memory to interpolate between pixel gain factors for two or more of the individual viewing angles in the pixel gain table to calculate the gain factor for the LED pixel.

14. The video processing device of claim 8, wherein the processor is configured to execute the instructions stored in the memory to calculate the individual gain factor for the LED pixel further based on a compensation strength control parameter.

15. A video processing device, comprising:

a memory storing instructions; and a processor coupled to the memory and configured to execute the instructions stored in the memory to:

generate a viewing angle map comprising individual viewing angles ($\theta_{horizontal}$, $\theta_{vertical}$) for each of a plurality of light emitting diode (LED) pixels of a video display device, the viewing angle map based on (i) individual three-dimensional (3D) locations ($pixel_x$, $pixel_y$, $pixel_z$) of each LED pixel of the plurality of LED pixels and (ii) a 3D location of a viewer of the LED pixel ($viewer_x$, $viewer_y$, $viewer_z$), where $\theta_{horizontal}$ for the individual LED pixel is calculated from the values $pixel_x$, $pixel_z$, $viewer_x$, and $viewer_z$ and $\theta_{vertical}$ for the individual LED pixel is calculated from the values $pixel_y$, $pixel_z$, $viewer_y$, and $viewer_z$;

generate a pixel gain map comprising individual gain factors for the LED pixels based on the viewing angle map and a pixel gain table comprising information relating to a relationship between pixel intensity and pixel viewing angle for the LED pixels; and transmit the pixel gain map to a video display device, the pixel gain map configured to cause the video display device to compensate pixel brightness of received frames of a video signal based on the pixel gain map.

16. The video processing device of claim 15, wherein the LED pixels of the video display device emit light in a plurality of colors and the pixel gain map comprises individual gain factors for each of the plurality of colors emitted by the LED pixels.

17. The video processing device of claim 15, wherein the processor is configured to execute the instructions stored in the memory to:

generate the viewing angle map for a subset of the LED pixels; and interpolate between the individual viewing angles for two or more of the LED pixels in the subset to calculate the individual viewing angles for the LED pixels not in the subset.

18. The video processing device of claim 15, wherein the processor is configured to execute the instructions stored in the memory to:

generate the viewing angle map for a subset of the LED pixels;

generate the pixel gain map for the subset of the LED pixels; and interpolate between the individual gain factors for two or more of the LED pixels in the pixel gain map to calculate the individual gain factors for the LED pixels not in the subset.

19. The video processing device of claim 15, wherein:

the pixel gain table comprises a lookup table including a pixel gain factor for each of a plurality of viewing angles; and the processor is configured to execute the instructions stored in the memory to interpolate between pixel gain factors for two or more of the individual viewing angles in the pixel gain table to calculate the individual gain factor for the LED pixel.

20. The video processing device of claim 15, wherein the processor is configured to execute the instructions stored in the memory to calculate the individual gain factor for the LED pixel further based on a compensation strength control parameter.

* * * * *